(12) United States Patent
Capewell et al.

(10) Patent No.: US 6,443,034 B1
(45) Date of Patent: Sep. 3, 2002

(54) ROTARY ACTUATOR AND SYSTEM

(75) Inventors: Richard Simon Capewell, Wolverhampton; Richard John McKay, Stafford, both of (GB)

(73) Assignee: Lucas Industries Limited, London (GB)

( * ) Notice: Subject to any disclaimer, the term of this patent is extended or adjusted under 35 U.S.C. 154(b) by 0 days.

(21) Appl. No.: 09/568,030

(22) Filed: May 10, 2000

(30) Foreign Application Priority Data

May 12, 1999 (GB) .............................................. 9911049

(51) Int. Cl.$^7$ .............................................. F16D 59/00
(52) U.S. Cl. ................. 74/665 GA; 74/665 S; 244/75 R; 475/15
(58) Field of Search ..................... 74/665 GA, 665 S, 74/89; 244/75 R, 213; 464/36; 475/15, 332

(56) References Cited

U.S. PATENT DOCUMENTS

| | | | |
|---|---|---|---|
| 3,935,754 A | * 2/1976 | Comollo .................... | 74/665 F |
| 4,255,946 A | * 3/1981 | Hansen .......................... | 464/36 |
| 4,556,131 A | * 12/1985 | Chapman ..................... | 192/223 |
| 4,578,993 A | 4/1986 | Burandt ......................... | 73/162 |
| 4,688,744 A | * 8/1987 | Aldrich ..................... | 244/75 R |
| 4,721,016 A | * 1/1988 | Burandt ....................... | 475/342 |
| 4,742,730 A | * 5/1988 | Dorn et al. .................. | 475/332 |
| 4,779,822 A | 10/1988 | Burandt et al. ............... | 244/75 |
| 4,932,929 A | * 6/1990 | Capewell .............. | 244/75 R X |
| 5,071,397 A | * 12/1991 | Grimm ........................ | 475/263 |
| 5,133,698 A | * 7/1992 | Hermans et al. ............. | 475/342 |
| 5,518,466 A | * 5/1996 | Tiedeman .................... | 475/342 |
| 5,779,587 A | * 7/1998 | Reilly ......................... | 475/263 |

\* cited by examiner

Primary Examiner—David A. Bucci
Assistant Examiner—Colby Hansen
(74) Attorney, Agent, or Firm—Well St. John P.S.

(57) ABSTRACT

An actuator system comprising a rotary actuator having an input member, a first output and a second output, the first and second outputs being arranged to move at substantially the same regular speed upon rotation of the input member, a drive shaft coupled to the input, and first and second output shafts coupled, respectively, to the first and second outputs. The invention also relates to a rotary actuator for use in the actuator system.

30 Claims, 7 Drawing Sheets

ROTARY ACTUATOR AND SYSTEM

FIELD OF THE INVENTION

This invention relates to a rotary actuator and system. The invention is particularly suitable for use in aerospace applications, for example for use in moving the flaps, hatches or doors of an aircraft.

BACKGROUND OF THE INVENTION

In a typical actuator system for a flap of an aircraft, for example one of the high lift leading edge flaps, a pair of rotary actuators are driven by a common drive shaft, the actuators being connected to respective levers or arms mounted adjacent opposite ends or edges of the flap. Where a plurality of flaps are to be moved in unison, the actuators associated with each flap may be driven by a common drive shaft. The provision of two rotary actuators associated with each flap results in the actuator system being heavy. It is an object of the invention to provide an actuator system of reduced weight It is a further object of the invention to provide an actuator suitable for use in such an actuator system which permits the detection of a fault indicative of a skew condition, and to provide a skew detection system suitable for use with other actuator systems.

SUMMARY OF THE INVENTION

According to a first aspect of the invention there is provided an actuator system comprising a rotary actuator having an input, a first output, and a second output, the first and second outputs being arranged to move at substantially the same angular speed upon rotation of the input, a drive shaft coupled to the input, and first and second output shafts coupled, respectively, to the first and second outputs.

The first and second output shafts may be coupled, in use, to respective arms or levers associated with opposite edges of a flap.

Such an actuator system is advantageous in that a single rotary actuator is associated with each flap. As a result, the actuator system is of reduced weight.

The first and second output shafts conveniently comprise torque tubes. The drive shaft conveniently extends through at least one of the torque tubes.

According to a second aspect of the invention there is provided a rotary actuator comprising an input, a drive member angularly moveable within a housing in response to rotation of the input, first and second angularly moveable outputs, and a drive arrangement for transmitting movement of the drive member to the first and second outputs.

The drive arrangement conveniently comprises a differential drive arrangement permitting limited relative angular movement of the first and second outputs. The differential drive arrangement conveniently comprises a "dog bone" differential drive arrangement.

Preferably, the rotary actuator further comprises a detection arrangement arranged to produce an output signal in the event that relative angular movement occurs between the first and second outputs.

The second output may include a member spring biased towards the drive member, the detector arrangement including a ball/ramp arrangement arranged to drive the said member of the second output against the action of the spring biasing in the event of relative angular movement occurring between the first and second outputs, and a position sensor arranged to monitor the position of the said member.

Where such an arrangement is used to move an aircraft flap, in the event of a skew condition arising, relative angular movement will occur between the first and second outputs, and as a result the said member will move, the movement being detected by the position sensor which generates a signal indicative of the presence of a skew condition.

In an alternative embodiment, one of the output shafts may carry an annular member, the detection arrangement including a C-spring arrangement arranged to act on the annular member. The drive member of the rotary actuator may be provided with at least one aperture for receiving a roller member, the roller member being engaged between the C-spring arrangement and the annular member. The C-spring arrangement may include a plurality of C-springs.

The detection arrangement may comprise at least one detent member received within a recess provided in the drive member and engaging a surface of the plate member, the detection arrangement being arranged such that, in the event of relative angular movement between the first and second outputs, relative movement between the annular member and the drive member causes the detent member to ride out of the recess, thereby causing movement of the plate member.

A position sensor may be employed to sense the position of the plate member. In the event of a skew condition arising, relative angular movement will occur between the first and second output, and as a result the plate member will move, the movement being detected by the position sensor which generates a signal indicative of the presence of a skew condition.

According to another aspect of the invention there is provided a detection arrangement for use with a rotary actuator as described herein, the detection arrangement comprising first and second angularly moveable members, a ball and ramp arrangement arranged such that, upon relative angular movement occurring between the first and second members, one of the first and second members moves axially, and a position sensor arranged to provide an output signal in the event that axial movement of the said one of the first and second members is detected.

According to another aspect of the invention, there is provided a detection arrangement for use with a rotary actuator as herein described, the detection arrangement comprising first and second angularly moveable members and a plate member arranged such that, upon relative angular movement occurring between the first and second members, the plate member is caused to move, a position sensor being arranged to provide an output signal in the event that movement of the plate member is detected.

In each case, the first and second members of the detection arrangement may be coupled to one another by a differential drive arrangement, for example a dog bone differential drive arrangement.

BRIEF DESCRIPTION OF THE VIEWS OF THE DRAWINGS

The invention will further be described, by way of example, with reference to the accompanying drawings, in which.

DETAILED DESCRIPTION

Figures 1, 1A:
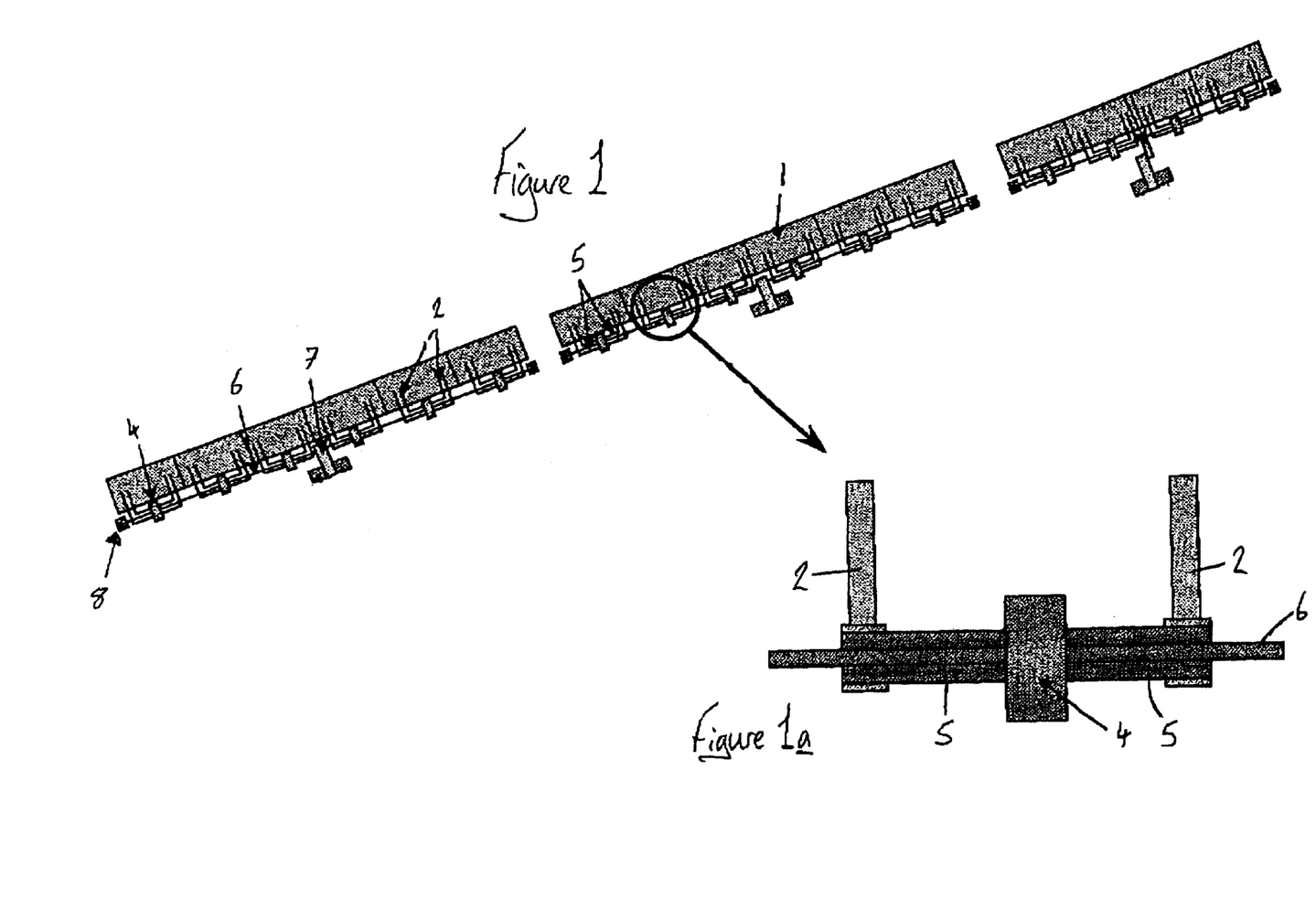
FIGS. 1 and 1a are diagrammatic views illustrating the actuator systems for a leading edge flap system.
Figure 2:
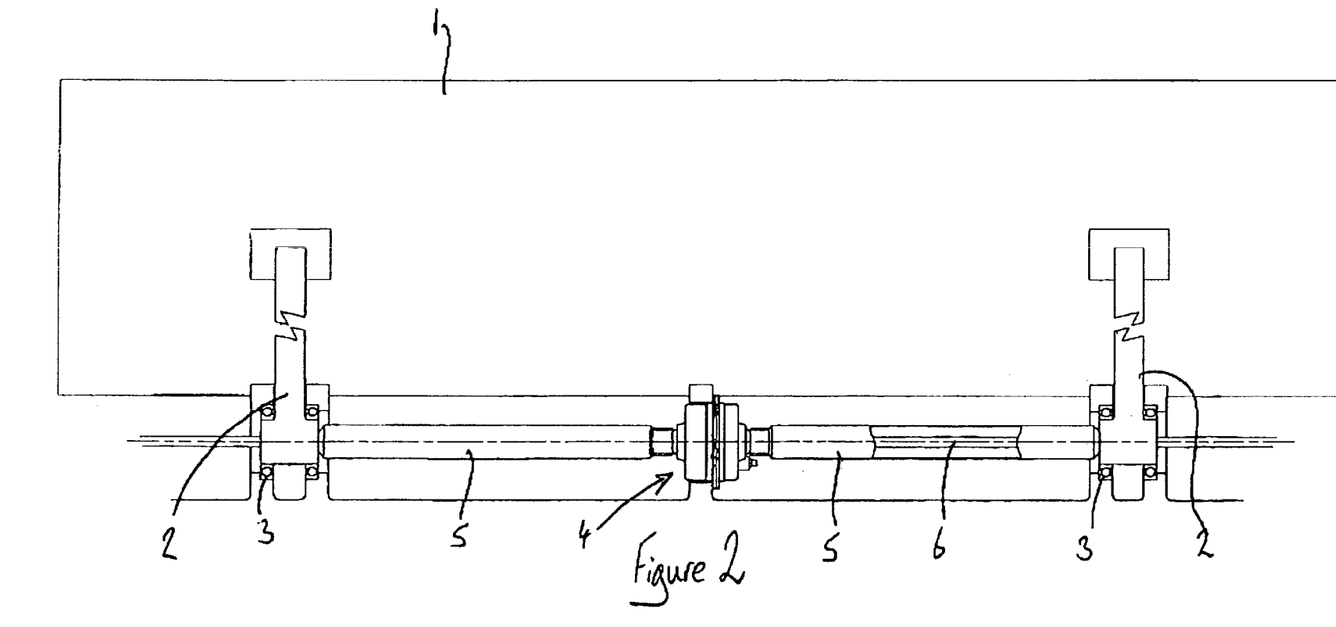
FIG. 2 is a view similar to FIG. 1a illustrating one of the systems in greater detail.

FIG. 1 illustrates a leading edge high lift flap system for use with an aircraft. As illustrated, the system comprises a plurality of flaps 1 which are pivotally mounted upon an aircraft wing. Each flap 1 has associated therewith a pair of lever arms 2 which are pivotally mounted upon the aircraft wing, the arms 2 cooperating with the flap 1 such that pivotal movement of the arms 2 causes the flap 1 to move relative to the wing. As illustrated in FIG. 2, each arm 2 is mounted for pivotal movement relative to the wing by means of bearings 3. The arms 2 are arranged to be driven, in use, by a rotary actuator 4, the actuator 4 having a pair of outputs, each output having connected thereto, a carbon fibre reinforced plastic high torque low speed torque tube 5, the end of which remote from the actuator 4 is secured to an input of a respective one of the arms 2 to drive the arms 2 for pivotal movement relative to the wing.

The rotary actuator 4 includes an input which is driven, in use, by a drive shaft 6. As illustrated in FIG. 1, the drive shaft 6 is common to a plurality of flaps 1 and is arranged to be driven by a power drive unit 7 under the control of an appropriate control arrangement. The power drive unit 7 is located approximately half way along the length of the drive shaft 6, and the ends of the drive shaft 6 have associated therewith a position sensor 8 which is arranged to detect rotational movement of the ends of the drive shaft 6, thus permitting detection of the failure of the drive shaft between the power drive unit 7 and the sensor 8. As illustrated in FIGS. 1a and 2, the drive shaft 6 extends substantially coaxially with the torque tubes 5, the drive shaft 6 extending through the torque tubes 5. Although the drive shaft 6 has been described, hereinbefore, as being a single integer or component, it will be appreciated that, if desired, the drive 6 may be made up of several components, each component extending between adjacent ones of the rotary actuators 4.

It will be appreciated that by providing a single rotary actuator 4 associated with each flap 1 rather than providing a separate rotary actuator associated with each of the arms 2 associated with the flap, the number of actuators present in the leading edge flap system may be reduced, and as a result, the weight of the system can be reduced.

Figure 3:
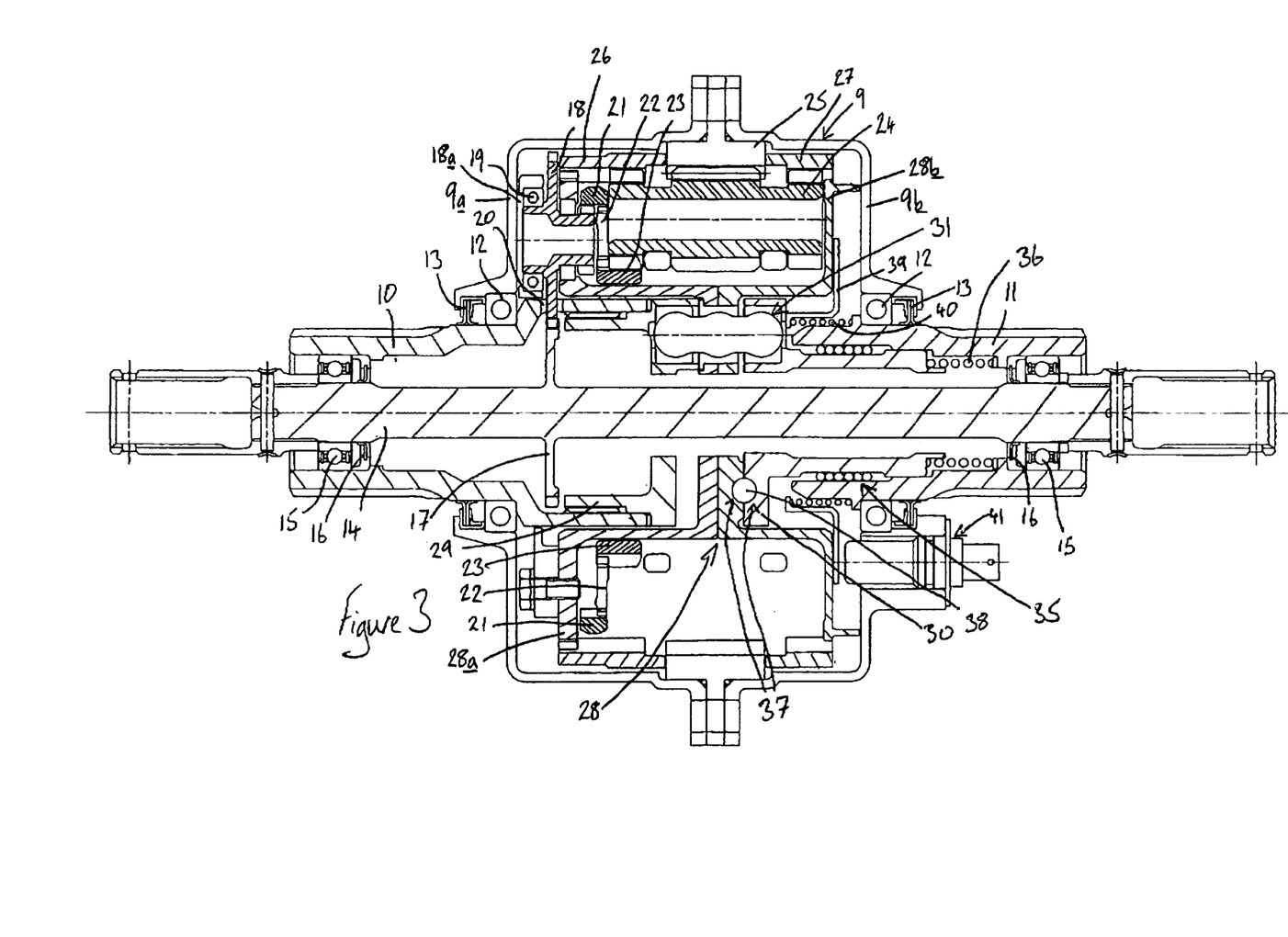
FIG. 3 is a sectional view of the actuator of the system of FIG. 2.

FIG. 3 is a sectional view of the rotary actuator 4 illustrated in FIGS. 1, 1a and 2. The rotary actuator 4 comprises a two-part housing 9a, 9b having first and second output members 10, 11 protruding therefrom. Bearings 12 are provided to rotatably mount the output members 10, 11 to the housing parts 9a, 9b and seal arrangements 13 are provided between the housing parts 9a, 9b and the first and second output members 10, 11. Rotatably mounted within the first and second outlet members 10, 11 is an input member 14, bearings 15 supporting the input member 14 for rotation relative to the first and second output members 10, 11. Appropriate seals 16 are also provided between the input member 14 and the output members 10, 11.

The input member 14 protrudes from both the first and second output members 10, 11, the ends of the input member 14 being shaped to form connectors whereby the component parts forming the drive shaft 6 can be secured to the input member 14 to drive the input member 14 for rotation relative to the housing parts 9a, 9b. The input member 14 is shaped to define an integral gear 17 which meshes with gears 18 mounted upon a carrier 18a located within the housing 9 defined by the housing parts 9a, 9b, the gears 18 being supported for rotation upon the carrier 18a by means of suitable bearings 19. As illustrated in FIG. 3, the gears 18 extend through slots 20 formed in the first output member 10. As, in use, the first and second output members 10, 11 are intended to move only through a relatively restricted angle, rather than to complete full rotations, the protrusion of the gears 18 through the slots 20 formed in the first output member 10 does not serve to limit the range through which the first output member 10 will be moved, in use.

The gears 18 form the input of an epicyclic gear reduction arrangement including a gear 21 which meshes with part of each of the gears 18, the gear 21 meshing with a series of linkage members 22 which, in turn, drive a sun gear 23. The sun gear 23 drives a compound planet gear arrangement 24, a central part of which meshes with an annular gear 25 secured to the housing 9. The end parts of the planet gear arrangement 24 drive first and second annular members 26, 27 which, in urn, cooperate with and drive parts 28a, 28b of a drive member 28 upon which the linkage members 22 are mounted. The end parts of the compound planet gear arrangement 24 are provided with one fewer teeth than the central part thereof, thus for each complete rotation of the planet gear arrangement 24, the annular members 26, 27 and the drive member 28 are moved relative to the housing 9 through a distance equivalent to the width of one tooth of the gear 25.

Figure 4:
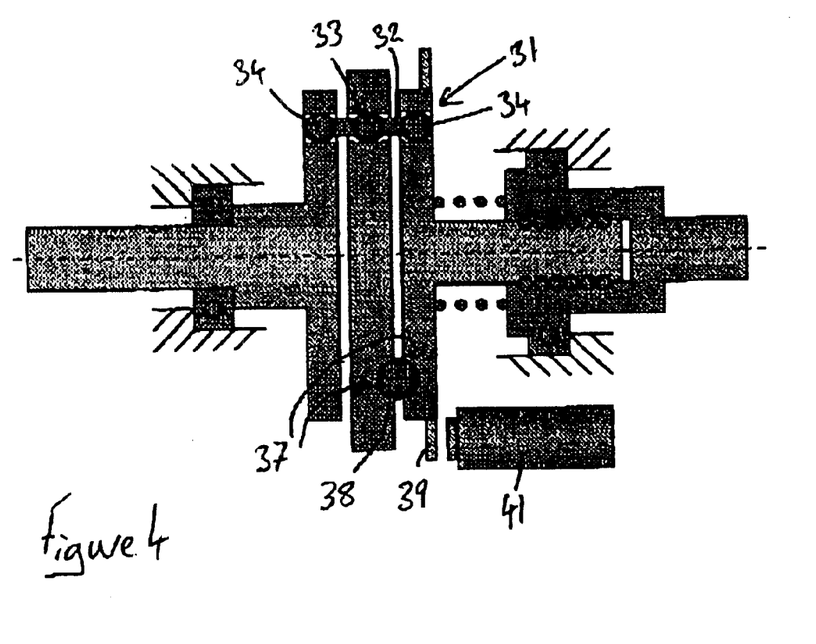
FIG. 4 is a diagram illustrating operation of the skew sensing mechanism used in the actuator of FIG. 3.

The drive member 28 is coupled to first and second intermediate drive members 29, 30 through a plurality of "dog bone" differential drive arrangements 31 (only one of which is illustrated). As illustrated in FIG. 4, the dog bone differential drive arrangements 31 comprise drive rods 32 which are pivotally mounted to the drive member 28 by means of spherical members 33 through which the rods 32 extend, the members 33 being located within bores formed in the drive member 28. The ends of the rods 32 are provided with similar spherical members 34 which are received within corresponding bores provided in the intermediate drive members 29, 30. The dog bone differential drive arrangements 31 are arranged to transmit angular movement of the drive member 28 to the intermediate drive members 29, 30 but to allow a limited amount of relative movement to occur between the intermediate drive members 29, 30, such movement being permitted by the rods 32 pivoting relative to the drive member 28. Although only a single dog bone differential drive arrangement 31 is illustrated in FIGS. 3 and 4, it will be appreciated that several such arrangements may be provided, if desired, and it is envisaged to provide three such arrangements in the rotary actuator.

The first intermediate drive member 29 is connected to the first output member 10 through a spline arrangement such that angular movement of the first intermediate drive member 29 is transmitted to the first output member 10. The second intermediate drive member 30 is connected to the second output member 11 through a ball spline arrangement 35 such that angular movement of the second intermediate drive member 30 is Remitted to the second output member 11. The ball spline arrangement 35 is arranged such that although relative angular movement is not permitted between the second intermediate drive member 30 and the second output member 11, relative axial movement between these components is permitted. A spring 36 is located between the second output member 11 and the second intermediate drive member 30 to bias the second intermediate drive member 30 towards the drive member 28.

The drive member 28 and the second intermediate drive member 30 are provided with recesses 37 within which a spherical member 38 is received. The recesses 37 and spherical member 38 together form a ball and ramp arrangement arranged such that, in normal use, when the first and second output members 10, 11 rotate at the same speed as each other and the drive member 28, the spring 36 holds the second intermediate drive member 30 in the position illustrated in FIG. 3. However, in the event that relative movement occurs between the first and second output members 10, 11, such movement being permitted by the dog bone differential drive arrangements 31, the second intermediate drive member 30 moves relative to the drive member 28 and the spherical member 38 will ride out of the recesses 37, forcing the second intermediate drive member 30 away from the drive member 28 against the action of the spring 36. The movement of the second intermediate drive member 30 causes an annular target member 39 which is biased by means of a spring 40 into engagement with the second intermediate drive member 30 to move, the movement of the target member 39 being detected by a position sensor 41.

In use, with the input member 14 connected to an appropriate component of the drive shaft 6 and with the first and second output members 10, 11 connected to respective torque tubes 5, rotation of the drive shaft 6 causes the input member 14 to rotate, the rotation of the input member 14 causing movement of the various gears to cause angular movement of the drive member 28. The angular movement of the drive member 28 is transmitted through the dog bone differential drive arrangements 31 to the first and second intermediate drive members 29, 30. The movement of the intermediate drive members 29, 30 is transmitted to the first and second output members 10, 11 and the associated torque tubes to drive the levers 2 and the flap 1 with which the rotary actuator 4 is associated.

In the event that one of the levers 2 becomes jammed or disconnects, different loads will be presented to the output members 10, 11. Provided the difference is sufficient to overcome a detent effect provided by the spring 36 and the ball and ramp arrangement, relative movement will occur between the first and second output members 10, 11 and the drive member 28. The relative movement between the drive member 28 and the second intermediate drive member 30 results in the spherical member 38 riding out of the recesses 37, forcing the second intermediate drive member 30 away from the drive member 28 against the action of the spring 36. As described hereinbefore, such movement causes the target 39 to move, and the movement of the target 39 is sensed by the position sensor 41. The position sensor 41 then provides an output signal indicative of the presence of a fault condition which is or could result in the generation of a skew condition. Upon the generation of such a signal, the system can be controlled in such a manner as to minimise the effect of the skew condition and the aircraft pilot can be alerted to the presence of the condition and compensate accordingly.

The size of the spring loading applied by the spring 36 to the ball and ramp arrangement can be selected in such a manner as to avoid the generation of fault signals where the difference in the loads on the output members 10, 11 is lower than a predetermined limit, thus avoiding the generation of nuisance fault signals, and allowing the mechanism to be tuned to take into account small permanent differential loads which may exist in certain arrangements or applications.

Although the output signal from the position sensor 41 could be supplied to a control unit independently of the output signals of the position sensors associated with the other rotary actuators 4 of the flap system illustrated in FIG. 1, it will be appreciated that the sensors 41 could be connected to one another in series, thus providing a fail safe arrangement in which the whole of the leading edge flap system can be shutdown in response to the presence of a fault in any part of that system.

In order to ensure the actuator functions correctly in circumstances in which the differential load across the output members 10, 11 is relatively large, the spring 36 must provide a relatively large biasing force. In order to remove the need for a large spring, an alternative arrangement may be employed, as shown in FIG. 5, in which similar parts to those shown in FIGS. 1 to 4 are referred to with like reference numerals.

Figure 5:
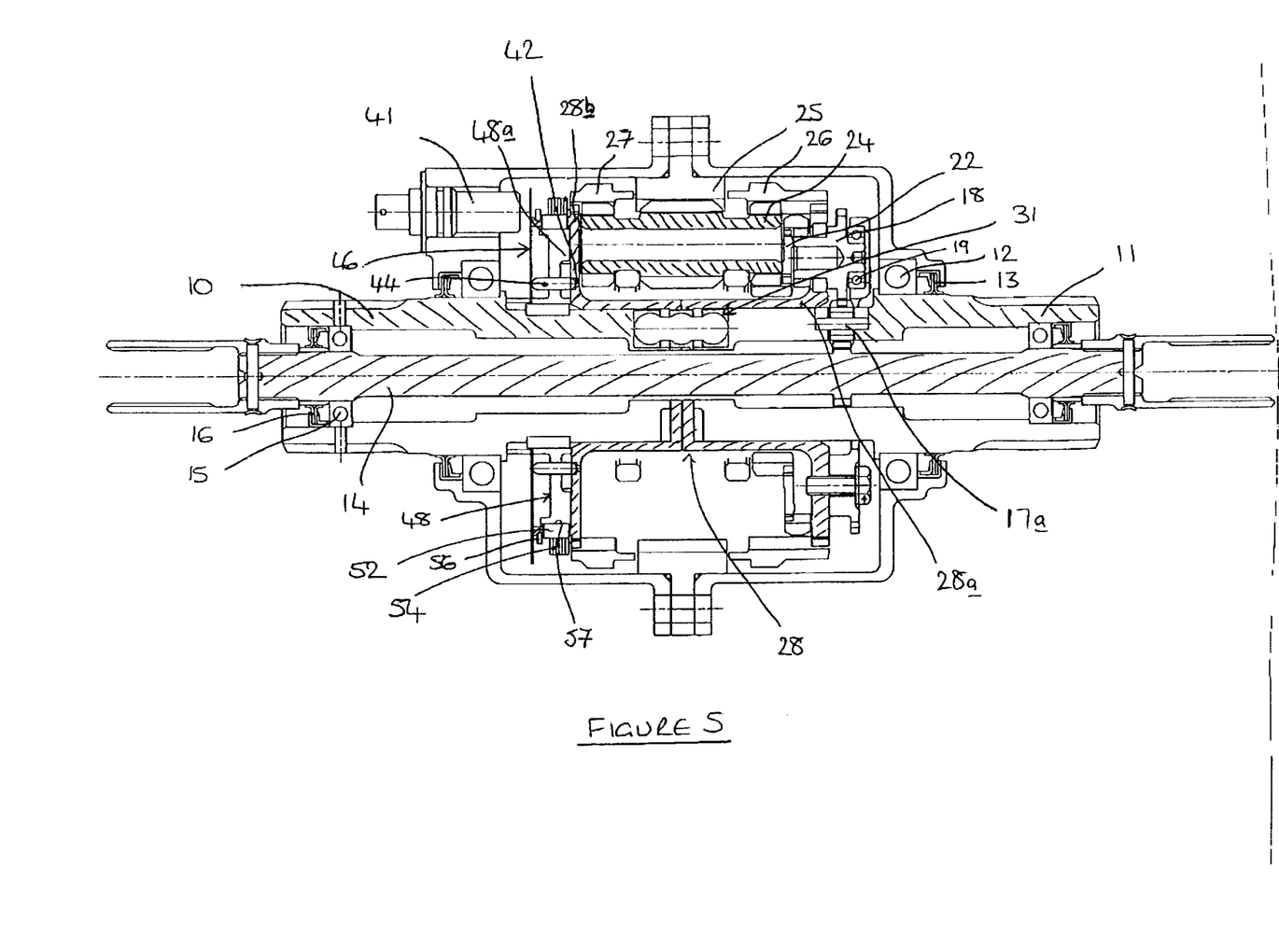
FIG. 5 is a sectional view of an alternative embodiment of an actuator to that shown in FIG. 3.
Figure 6:
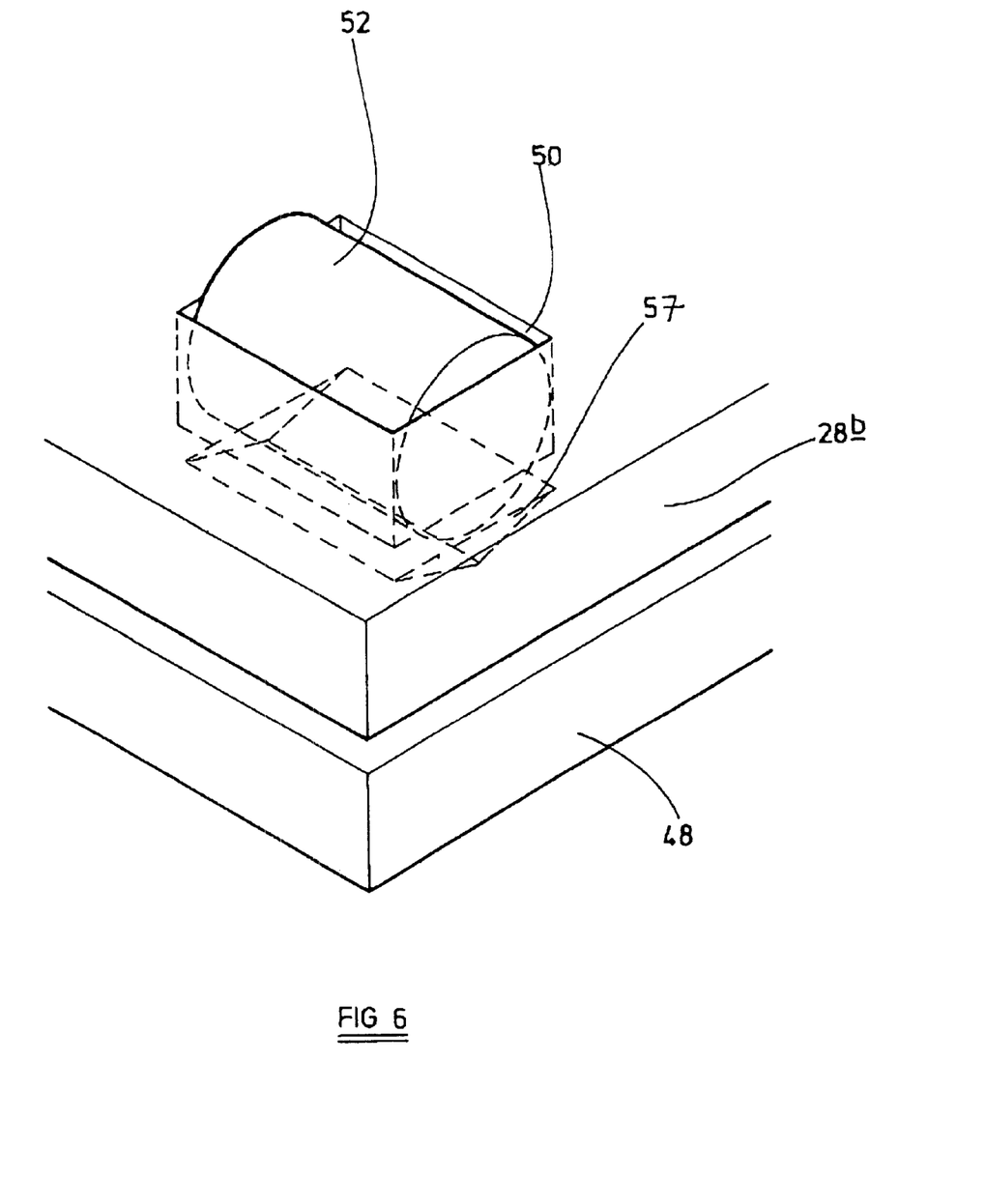
FIG. 6 is a perspective view of a roller member forming part of the actuator in FIG. 5.
Figure 7:
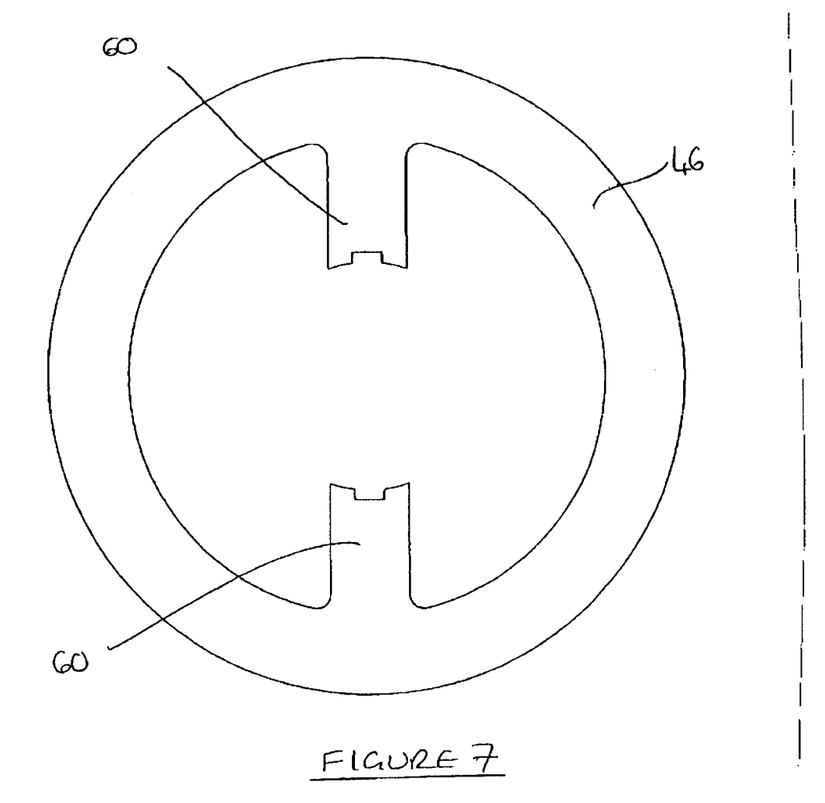
FIG. 7 is a plan view of a plate member forming part of the actuator in FIG. 5.

Referring to FIGS. 5 to 7, the input member 14 drives a gear 17a which meshes with gears 18 supported for rotation by means of the bearings 19. As in the embodiment shown in FIG. 3, the end parts of the planet gear arrangement 24 driving first and second annular members 26, 27 which, in turn, cooperate with the drive parts 28a, 28b of the drive member 28.

The drive part 28b is provided with a plurality of recesses 42, each of which receives one end of a detent member 44, the other end of each detent member 44 engaging a plate member 46. The output member 10 carries an annular rubber 48, the member 48 being provided with slots through which the detent members 44 extend. The plate member 46 is secured to the annular member 48 such that the plate member is rotatable with the output member 10.

The drive part 28b of the drive member 28 includes a flange which is provided with a plurality of apertures 50 (as shown in FIG. 6), each of which receives a respective roller member 52. The roller members 52 are engaged between ramped detents or recesses 57 in the outer periphery of the annular member 48 and the inner surface of the C-spring arrangement 54 such that the C-spring arrangement 54 serves to urge the roller members 52, and hence the annular member 48, towards a position in which the detent members 44 are seated within the recesses 42. Typically, the C-spring arrangement 54 comprises a plurality of C-springs. A circlip 56 is arranged to maintain the C-spring arrangement 54 in a fixed position relative to the annular member 48. As can be seen most clearly in FIG. 7, the plate member 46 is of disc-like form and the inner surface comprises two inwardly extending regions 60 which are secured to the annular member 48.

In use, with the input member 14 connected to an appropriate component of the drive shaft 6 and with the first and second output members 10, 11 connected to respective torque tubes, rotation of the drive shaft 6 causes the input member 14 to rotate, the rotation of the input member 14 causing movement of the various gears to cause angular movement of the drive member 28 and, hence, driving movement of the levers 2 and the flap with which the actuator is associated, as described previously.

In the event that one of the levers becomes jammed or disconnects, different loads will be presented to the output members 10, 11. If the differential load across the output members 10, 11 exceeds the biasing force due to the C-spring arrangement 54 acting on the roller members 52, the roller members 52 will be caused to move in a radially outward direction within their respective apertures 50, thereby permitting relative movement between the annular member 48 and the drive member 28. Such relative movement between the annular member 48 and the drive member 28 causes the detent members 44 to ride out of their respective recesses 42. As the detent members 44 engage the plate member 46, and as the regions 60 of the plate member 46 are secured to the output member 10, movement of the detent members 44 out of the recesses 42 will cause the plate member 46 to bend. Bending movement of the plate member 46 is sensed by means of the position sensor 41 and the position sensor 41 provides an output signal indicative of the presence of a fault condition which is, or could result in, the generation of a skew condition.

The surface of the drive part 28a is preferably shaped to cooperate with an inner region 48a of the annular member 48 so as to limit the extent of relative movement between the drive member 28 and the member 48.

Although in the description hereinbefore, the rotary actuator and actuator system are described in relation to a leading edge flap arrangement or system, it will be appreciated that the actuator and actuator system are suitable for use in other aerospace applications in which a flap, hatch or door must be moved Further, although the description is of an arrangement in which arms or levers are moved by the actuator, the invention is also applicable to arrangements in which the actuator drives a rack and pinion drive. Also, the skew sensing mechanism can be employed in units other an rotary actuators, for example in power drive units.

We claim:

1. An actuator system comprising a rotary actuator having an input member, a first output and second output, the first and second outputs being arranged to move at substantially the same angular speed upon rotation of the input member, a drive shaft coupled to the input member, and first and second output shafts coupled, respectively, to the first and second outputs, wherein the first and second output shafts each comprise a torque tube wherein the drive shaft extends through at least one of the torque tubes.

2. A rotary actuator for use in the actuator system as claimed in claim 1, comprising a drive member angularly moveable within a housing in response to rotation of the input and a drive arrangement for transmitting movement of the drive member to the first and second outputs.

3. The rotary actuator as claimed in claim 2, wherein the drive arrangement comprises a differential drive arrangement permitting limited relative angular movement of the first and second outputs.

4. The rotary actuator as claimed in claim 3, wherein the differential drive arrangement comprises a dog bone differential drive arrangement.

5. The rotary actuator as claimed in claim 2, further comprising a detection arrangement arranged to produce an output signal in the event of relative angular movement between the first and second outputs.

6. The rotary actuator as claimed in claim 5, wherein the second output includes a member biased towards the drive member by a spring, the detection arrangement being arranged to drive the member of the second output against the action of the spring in the event of relative angular movement between the first and second outputs.

7. The rotary arrangement as claimed in claim 6, wherein the detection arrangement includes a ball/ramp arrangement.

8. The rotary actuator as claimed in claim 6, wherein the detection arrangement includes a position sensor arranged to monitor the position of the member.

9. The rotary actuator as claimed in claim 5, wherein one of the output shafts carries an angular member, the detection arrangement including a C-spring arrangement arranged to act on the annular member.

10. The rotary actuator as claimed in claim 9, wherein the drive member is provided with an aperture for receiving a roller member, the roller member being engaged between the C-spring arrangement and the annular member.

11. The rotary actuator as claimed in claim 10, wherein the detection arrangement comprises a detent member, one end of which is received within a recess provided in the drive member and the other end of which engages a surface of the plate member, the detection arrangement being arranged such that, in the event of relative angular movement between the first and second outputs, relative movement between the annular member and the drive member causes the detent member to ride out of the recess, thereby causing movement of the plate member.

12. The rotary actuator as claimed in claim 11, wherein the drive member is shaped to cooperate with a region of the annular member so as to limit the extent of relative movement between the drive member and the annular member.

13. The rotary actuator as claimed in claim 11, wherein the detection arrangement includes a position sensor arranged to monitor the position of the plate member.

14. A detection arrangement for use with a rotary actuator as claimed in claim 2, the detection arrangement comprising first and second angularly moveable members, a ball and ramp arrangement, including a spherical member, the ball and ramp arrangement being arranged such that, upon relative angular movement occurring between the first and second members, the spherical member acts to move one of the first and second members axially, and a position sensor arranged to provide an output signal in the event that axial movement of the said one of the first and second members is detected.

15. A detection arrangement for use with a rotary actuator as claimed in claim 2, the detection arrangement comprising first and second angularly moveable members and a plate member arranged such that, upon relative angular movement occurring between the first and second members, the plate member is caused to move, and a position sensor arranged to provide an output signal in the event that movement of the plate member is detected.

16. The actuator system as claimed in claim 1, wherein the first and second output shafts are coupled, in use, to respective levers associated with opposite ends of a flap.

17. A rotary actuator for use in an actuator system having a drive shaft and first and second output shafts, each comprising a torque tube, wherein the drive shaft extends through at least one of the torque tubes, and wherein the rotary actuator includes an input member, a first output coupled to the first output shaft, a second output coupled to the second output shaft, in use, a drive member angularly moveable within a housing in response to rotation of the input member and a drive arrangement for transmitting movement of the drive member to the first and second outputs, wherein the drive arrangement comprises a differential drive arrangement permitting limited relative angular movement of the first and second outputs, and wherein the input member drives a gear arrangement, which drives the first and second outputs through the differential drive arrangement.

18. The rotary actuator as claimed in claim 17, wherein the differential drive arrangement comprises a dog bone differential drive arrangement.

19. An actuator system comprising a rotary actuator having an input member, a first output and a second output, the first and second outputs being arranged to move at substantially the same angular speed upon rotation of the input member, a drive shaft coupled to the input member, and first and second output shafts coupled, respectively, to the first and second outputs, wherein rotation of the input member is transmitted to the first and second outputs by a drive arrangement comprising a drive member angularly moveable within a housing in response to rotation of the input member, said actuator system further comprising a detection arrangement arranged to produce an output signal in the event of relative angular movement between the first and second outputs.

20. The actuator system as claimed in claim 19, wherein the drive arrangement comprises a differential drive arrangement permitting limited relative angular movement of the first and second outputs.

21. The actuator system as claimed in claim 19, wherein the second output includes a member biased towards the drive member by a spring, the detection arrangement being arranged to drive the member of the second output against the action of the spring in the event of relative angular movement between the first and second outputs.

22. The actuator system as claimed in claim 21, wherein the detection arrangement includes a position sensor arranged to monitor the position of the member.

23. The actuator system as claimed in claim 19, wherein the detection arrangement comprises a detent member, one end of which is received within a recess provided in the drive member and the other end of which engages a surface of the plate member, the detection arrangement being arranged such that, in the event of relative angular movement between the first and second outputs, relative movement between the annular member and the drive member causes the detent member to ride out of the recess, thereby causing movement of the plate member.

24. The actuator system as claimed in claim 23, wherein the detection arrangement includes a position sensor arranged to monitor the position of the plate member.

25. An actuator system comprising a rotary actuator having an input member, a first output and a second output, the first and second outputs being arranged to move at substantially the same angular speed upon rotation of the input member, a drive shaft coupled to the input member, and first and second output shafts coupled, respectively, to the first and second outputs, wherein rotation of the input member is transmitted to the first and second outputs by a drive arrangement comprising a drive member angularly moveable within a housing in response to rotation of the input, said actuator system further comprising a detection arrangement arranged to produce an output signal in the event of relative angular movement between the first and second outputs, the detection arrangement further including a C-spring arrangement arranged to act on an annular member carried by one of the output shafts.

26. The actuator system as claimed in claim 25, wherein the drive arrangement comprises a differential drive arrangement permitting limited relative angular movement of the first and second outputs.

27. The actuator system as claimed in claim 25, wherein the drive member is provided with an aperture for receiving a roller member, the roller member being engaged between the C-spring arrangement and the annular member.

28. The actuator system as claimed in claim 27, wherein the detection arrangement comprises a detent member, one end of which is received within a recess provided in the drive member and the other end of which engages a surface of the plate member, the detection arrangement being arranged such that, in the event of relative angular movement between the first and second outputs, relative movement between the annular member and the drive member causes the detent member to tide out of the recess, thereby causing movement of the plate member.

29. The actuator system as claimed in claim 28, wherein the drive member is shaped to cooperate with a region of the annular member so as to limit the extent of relative movement between the drive member and the annular member.

30. The actuator system as claimed in claim 28, wherein the detection arrangement includes a position sensor arranged to monitor the position of the plate member.

* * * * *